July 16, 1968    P. J. PERKINS, JR    3,392,864
INSULATION SYSTEM
Filed Feb. 3, 1965

INVENTOR
PORTER J. PERKINS, JR.

BY

ATTORNEYS

United States Patent Office 3,392,864
Patented July 16, 1968

3,392,864
INSULATION SYSTEM
Porter J. Perkins, Jr., Rocky River, Ohio, assignor to the United States of America as represented by the National Aeronautics and Space Administration
Filed Feb. 3, 1965, Ser. No. 430,226
7 Claims. (Cl. 220—9)

ABSTRACT OF THE DISCLOSURE

Insulation for cryogenic materials comprising sheets of light weight plastic foam. A positive airtight seal covers the foam to ensure the basic conductivity will not be degraded by any fluid that is cryopumped into the insulation.

---

The invention described herein may be manufactured and used by or for the Government of the United States of America for governmental purposes without the payment of any royalties thereon or therefor.

This invention is directed to lightweight, low-thermal-conductivity insulation and is concerned with insulating cryogenic materials, such as liquid rocket propellants. The invention is particularly useful for insulating liquid hydrogen fueled rocket booster tanks.

Because of its high theoretical performance liquid hydrogen is a desirable propellant for chemical and nuclear rockets. However, this propellant has a very low boiling temperature, −423° F., as well as a very low density which results in a high tank surface area per unit weight of propellant, and this combination is the cause of high boil-off losses in hydrogen storage tanks. Hydrogen boil-off is normally vented overboard, but during the early phases of a boost trajectory within the atmosphere and at relatively low velocities it is hazardous to vent the highly combustible hydrogen. Therefore, sufficient insulation must be provided for the hydrogen storage tanks to prevent excessive pressure increases when tank vent valves are closed.

It has been proposed that rigid plastic foams be utilized to insulate liquid hydrogen storage tanks. While this low density material has high thermal resistance, a major practical problem arises in applying such a material to the tank walls in a manner that will achieve a reliable and predictable system. Insulation attachment methods and the techniques used to prevent condensation of gases in the material reduce the overall thermal effectiveness of an insulation system as compared to the basic insulation material. When the foam is placed on the inside surface of the tank wall, a seal must be provided to prevent entry of the liquid hydrogen into the insulation and the resulting degradation of the insulating effectiveness. It is also necessary that internal foam insulation be able to withstand the compressive load imposed on it by tank pressurization, and difficult attachment problems are encountered. In some cases the rigid foam is secured to the external surface of the tank, and a noncondensable purge gas, such as helium, is used to provide a barrier between the tank and the insulation which prevents cryopumping of condensable gases into and behind the insulation. Purging adds complications at launch because of the requirement of supplying helium during ground hold, disconnecting the supply at launch, and providing adequate venting of the purge channel during the launch trajectory.

The problems encountered with internally insulated tanks and purged externally insulated tanks have been solved by the insulation system of the present invention which utilizes a low density foam as the primary insulation medium. This foam insulation is covered with a positive seal to make certain the basic conductivity of the foam will not be degraded by any gas or liquid cryopumping into the foam. With such a seal, trapped gases within the insulation are cryopumped to the cold boundary of the foam thereby causing material to be evacuated. This sealed external insulation is attached to the tank by bonding in conjunction with an external constrictive wrap of a lightweight, high strength material, and protection of the insulation from erosion by the high temperature windstream during launch is provided by a layer of glass cloth interposed between the foam and the constrictive wrap.

It is, therefore, an object of the present invention to provide a cryogenic storage tank with a sealed external insulation system which is self-contained as well as light in weight and which can be used with a minimum of complications.

Another object of the invention is to provide a predictable insulation system having improved reliability which need not be jettisoned thereby eliminating a critical sequence in the launch operation of a liquid hydrogen fueled rocket.

A further object of the invention is to provide an improved lightweight insulation system for liquid hydrogen fueled rocket booster tanks which prevents excessive boil-off losses of this propellant during ground standby of the rocket and during boost of the rocket through the atmosphere.

These and other objects of the invention will be apparent from the specification which follows and from the drawings wherein like numerals are used throughout to identify like parts.

Figure 1:
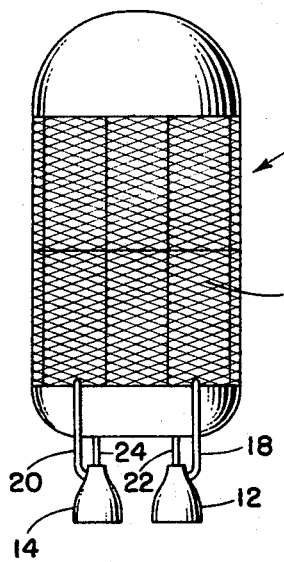
FIG. 1 is an elevation view of a typical rocket vehicle with a liquid propellant storage tank having an insulation system constructed in accordance with the present invention.
Figure 2:
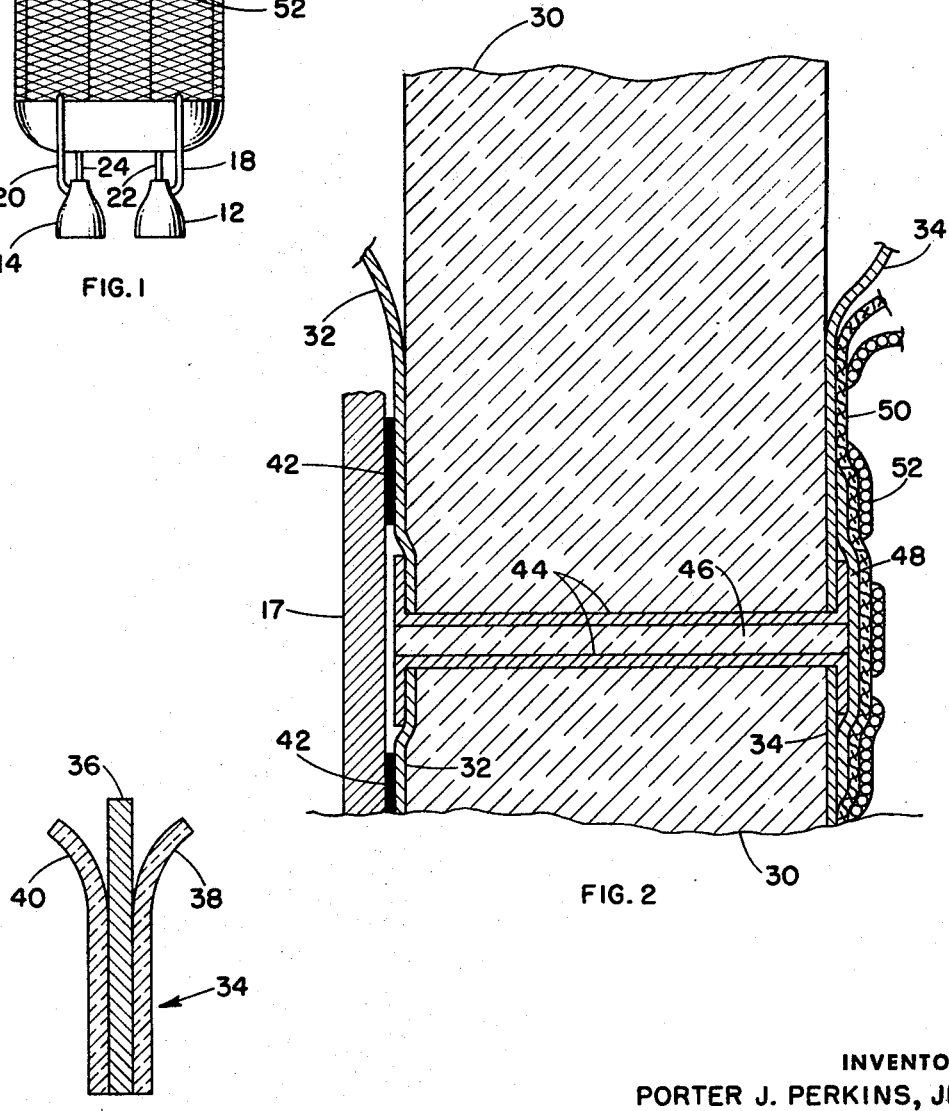
FIG. 2 is an enlarged sectional view of a portion of the wall of the liquid propellant storage tank showing the construction of the insulation system and the manner in which it is attached to the tank.

Referring now to the drawings, there is shown in FIG. 1 a rocket vehicle having booster engines 12 and 14 which utilize a cryogenic propellant, such as liquid hydrogen, that is stored in a tank 16 having a wall 17 as illustrated in FIG. 2. The liquid hydrogen is transferred from the tank 16 to the engines 12 and 14 through propellant supply lines 18 and 20, respectively. Another propellant, such as liquid oxygen, is likewise conducted to the engines 12 and 14 through supply lines 22 and 24, respectively.

A lightweight insulation system constructed in accordance with the present invention is mounted on the outer surface of the tank wall 17 as shown in FIG. 2. This insulation system includes a plurality of rigid panels 30 arranged about the tank 16 as shown in FIG. 1, and each panel 30 is fabricated from a Freon blown polyurethane foam having a low density of two pounds per cubic foot. This foam, which constitutes the primary insulation material, has a closed cell structure and a low thermal conductivity, particularly at the cold mean temperatures of liquid hydrogen storage tanks. By way of example, panels 30 having a thickness of 0.4 inch have a thermal conductivity in the range between 0.10 and 0.13 (B.t.u.) (in.)/ hr.) (sq. ft.) (° R.) under ground hold conditions which results in a mean temperature of about 250° R.

An important feature of the invention is the provision of a film 32 on the inwardly directed surface of each panel 30 adjacent to the tank wall 17 and a similar film 34 on the opposite outside surface. The films 32 and 34 are bonded to both surfaces of the panel 30 with a thin coat of polyester adhesive to form a hermetic seal which prevents cryopumping of liquids and gases into the foam.

Figure 3:
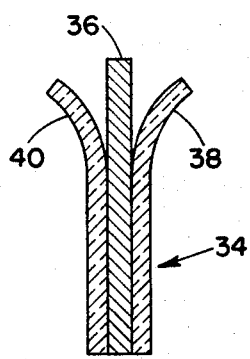
FIG. 3 is an enlarged sectional view of the positive seal which covers the primary insulating medium.

The film 34 is a three ply laminate as shown in FIG. 3, and the film 32 is of the same construction. The laminate consists of aluminum foil 36 between layers 38 and 40 of polyester plastic, such as Mylar. The aluminum foil 36, having no measurable permeability, acts as the principal vapor barrier. The tough Mylar layers 38 and 40 supply strength to the laminate and prevent damage to the foil 36 during fabrication and installation of the panels 30 on the tank 16. Even though the films 32 and 34 are very thin, on the order of 0.0015 inch, they add considerable rigidity to the panels 30 which enables the foam to be formed into moderate contours without heat forming. By way of example, a film of aluminum foil 36 having a thickness of 0.001 inch with layers of polyester plastic 38 and 40, each having a thickness of 0.00075 inch bonded to the opposite surfaces has proved to be highly satisfactory.

After the sealing films 32 and 34 have been secured to the surface of the foam panel 30, the edges of the panels 30 are covered by channels 44 of polyester film. The resulting insulating structure is secured to the outer surface of the tank wall 17 by a suitable sealing compound 42. A layer of foam 46 is interposed between the channels 44 of adjacent panels, and a film 48 in the form of tape having a construction the same as films 32 and 34 is used to seal the resulting joint by covering the channels 44 and the exposed edges of the foam layer 46 as shown in FIG. 2.

After the insulating panels have been bonded to the outer surface of the wall of the tank 16, a thin layer of glass cloth 50 having a light weight, such as 0.01 p.s.f., is applied over the panels 30 to provide protection from aerodynamic forces and heating. The panels 30 and protective covering 50 are held securely to the tank wall 17 by a constrictive wrap 52 of fiberglass roving or nylon strands having a sufficient prestress to maintain a compressive load on the panels 30 under all conditions encountered during ground standby and launch. The compressive load produced by the constrictive wrap replaces any structural reinforcement that the foam panels 30 would need to withstand aerodynamic forces if not supported in this manner, and the panels 30 add rigidity to the thin walled tank 16.

The sealing compound 42 not only prevents air from cryopumping into any space that would exist between the panels 30 and the tank wall 17, but also holds the panels 30 in place while the constrictive wrap 52 is wound around the tank 16. The constrictive wrap 52 is applied by a filament winding machine which produces an open wrap pattern shown in FIG. 1 with a ¼ inch wide diamond configuration. The number of wraps per linear inch is determined by the initial compressive load required to prevent flutter or separation of the insulation because of aerodynamic forces during launch. A pretensioning strain of 0.84 percent on the fiberglass roving in the constrictive wrap 52 which produces a two pounds per square inch compressive load has been sufficient to accommodate the shrinkage of stainless steel tank walls as they are cooled to liquid hydrogen temperature, allow for fiberglass expansion during aerodynamic heating, and allow for any deformation of the foam by compression and heating.

While a preferred embodiment of the invention has been disclosed and described, various modifications may be made to the insulation system without departing from the spirit of the invention or the scope of the subjoined claims.

What is claimed is:

1. A lightweight system for insulating a cryogenic material in a storage tank comprising
    a plurality of substantially rigid panels of insulating material secured to the outer surface of the tank by a sealing compound which fills the space between the panels and the tank, and
    means forming an airtight seal adjacent the surfaces of each of said panels to prevent cryopumping of fluids into said insulating material when the outer surface of the tank is cooled by the cryogenic material.

2. In combination with a tank for storing cryogenic fluids, an insulation system comprising
    panels of rigid foam secured to the outer surface of the tank by a sealing compound to prevent air from cryopumping into any space between the tank and the panels, and
    a gas impervious metal film for hermetically sealing the surfaces of each of said panels to prevent cryopumping of liquids and gases into the foam thereby insuring the basic conductively thereof will not be degraded when said panels are cooled by the cryogenic fluids.

3. An insulation system as claimed in claim 2 wherein the film comprises a three-ply laminate consisting of a single layer of foil having a polyester plastic secured to each surface thereof.

4. In combination with a tank for storing cryogenic fluids, an insulation system comprising
    panels of rigid foam positioned about the outer surface of the tank,
    a thin gas impervious film for hermetically sealing the surfaces of each of said panels to prevent cryopumping of liquids and gases into the foam thereby insuring the basic conductivity thereof will not be degraded, and
    a layer of glass cloth in contact with the film on the outwardly facing surfaces of the panels for supplying protection from aerodynamic forces.

5. An insulation system as claimed in claim 2 including a constrictive wrap of prestressed filaments encircling the tank for holding the panels against the outer surface thereof.

6. In combination with a tank for storing cryogenic fluids, an insulation system comprising
    panels of rigid foam positioned about the outer surface of a tank,
    a thin gas impervious film for hermetically sealing the surfaces of each of said panels to prevent cryopumping of liquids and gases into the foam thereby insuring the basic conductivity thereof will not be degraded, and
    a prestressed constrictive wrap comprising glass roving encircling the tank for holding the panels against the outer surface thereof.

7. In combination with a tank for storing cryogenic fluids, an insulation system comprising
    panels of rigid foam positioned about the outer surface of a tank,
    a thin gas impervious film for hermetically sealing the surfaces of each of said panels to prevent cryopumping of liquids and gases into the foam thereby insuring the basic conductivity thereof will not be degraded, and
    a prestressed constrictive wrap comprising nylon strands encircling the tank for holding the panels against the outer surface thereof.

References Cited

UNITED STATES PATENTS

| | | | |
|---|---|---|---|
| 1,580,413 | 4/1926 | Cover | 220—9 |
| 1,727,684 | 9/1929 | Willoughby | 220—63 |
| 2,323,297 | 7/1943 | Collins | 220—63 |
| 2,685,979 | 8/1954 | Zeek et al. | 220—3 |
| 2,691,458 | 10/1954 | Dinwiddie | 220—9 |
| 2,718,583 | 9/1955 | Noland et al. | 220—3 |
| 2,719,099 | 9/1955 | Holbrook | 220—9 |
| 2,779,066 | 1/1957 | Gaugler et al. | |
| 2,837,456 | 6/1958 | Parilla | 220—3 |

(Other references on following page)

UNITED STATES PATENTS

| | | |
|---|---|---|
| 2,928,456 | 3/1960 | Potchen et al. |
| 2,956,310 | 10/1960 | Roop et al. |
| 2,958,210 | 11/1960 | Rill. |
| 2,982,457 | 5/1961 | D'Alelio _____ 229—3.5 |
| 2,999,041 | 9/1961 | Lappala. |
| 3,003,810 | 10/1961 | Kloote et al. _____ 220—9 |
| 3,091,946 | 6/1963 | Kesling _____ 220—9 |
| 3,093,259 | 6/1963 | Morrison _____ 220—9 |
| 3,181,311 | 5/1965 | Latzer _____ 220—9 |
| 3,251,382 | 5/1966 | Tatsch _____ 220—9 |
| 3,150,793 | 9/1964 | Messer _____ 220—9 |
| 3,302,358 | 2/1967 | Jackson _____ 220—9 |

FOREIGN PATENTS

| | | |
|---|---|---|
| 628,313 | 10/1961 | Canada. |
| 854,480 | 11/1960 | Great Britain. |

THERON E. CONDON, *Primary Examiner.*

J. R. GARRETT, *Assistant Examiner.*